United States Patent [19]

Ballman

[11] 4,198,593
[45] Apr. 15, 1980

[54] BATTERY CHARGER CONTROL DEVICE

[76] Inventor: Gray C. Ballman, 30 Portland Dr., St. Louis, Mo. 63131

[21] Appl. No.: 825,943

[22] Filed: Aug. 19, 1977

[51] Int. Cl.² .............................................. H02J 7/10
[52] U.S. Cl. ...................................... 320/31; 320/37; 320/39
[58] Field of Search ...................... 320/37, 38, 40, 39, 320/31, 34, 19; 58/23 AC; 307/141 R, 141.4, 141.8; 361/196, 199

[56] References Cited

U.S. PATENT DOCUMENTS

| | | | |
|---|---|---|---|
| 3,081,426 | 3/1963 | Bakke | 320/38 X |
| 3,408,513 | 10/1968 | Cooper et al. | 361/199 X |
| 3,475,061 | 10/1969 | Steinkamp et al. | 320/40 X |
| 3,593,100 | 7/1971 | Foster | 320/31 X |
| 3,652,916 | 3/1972 | Ballman | 320/40 X |

*Primary Examiner*—Robert J. Hickey

*Attorney, Agent, or Firm*—Joseph A. Fenlon

[57] ABSTRACT

A battery charger control device which senses the placement of a battery across charging terminals and utilizes the voltage thereof to actuate a relay which turns on a battery charger, which utilizes a pulse generator to charge a capacitor over a period of several hours after the battery has been placed across the terminals, which monitors the charge condition of the battery as determined by the voltage across the terminals and which automatically and independently of the pulse generator applies charging current to the capacitor after the voltage across the terminals exceeds an adjustably preselected magnitude, and which utilizes the charge condition of the capacitor to turn off the battery charger after the lapse of a predetermined period of time or after the battery has become fully charged, whichever occurs first.

3 Claims, 1 Drawing Figure

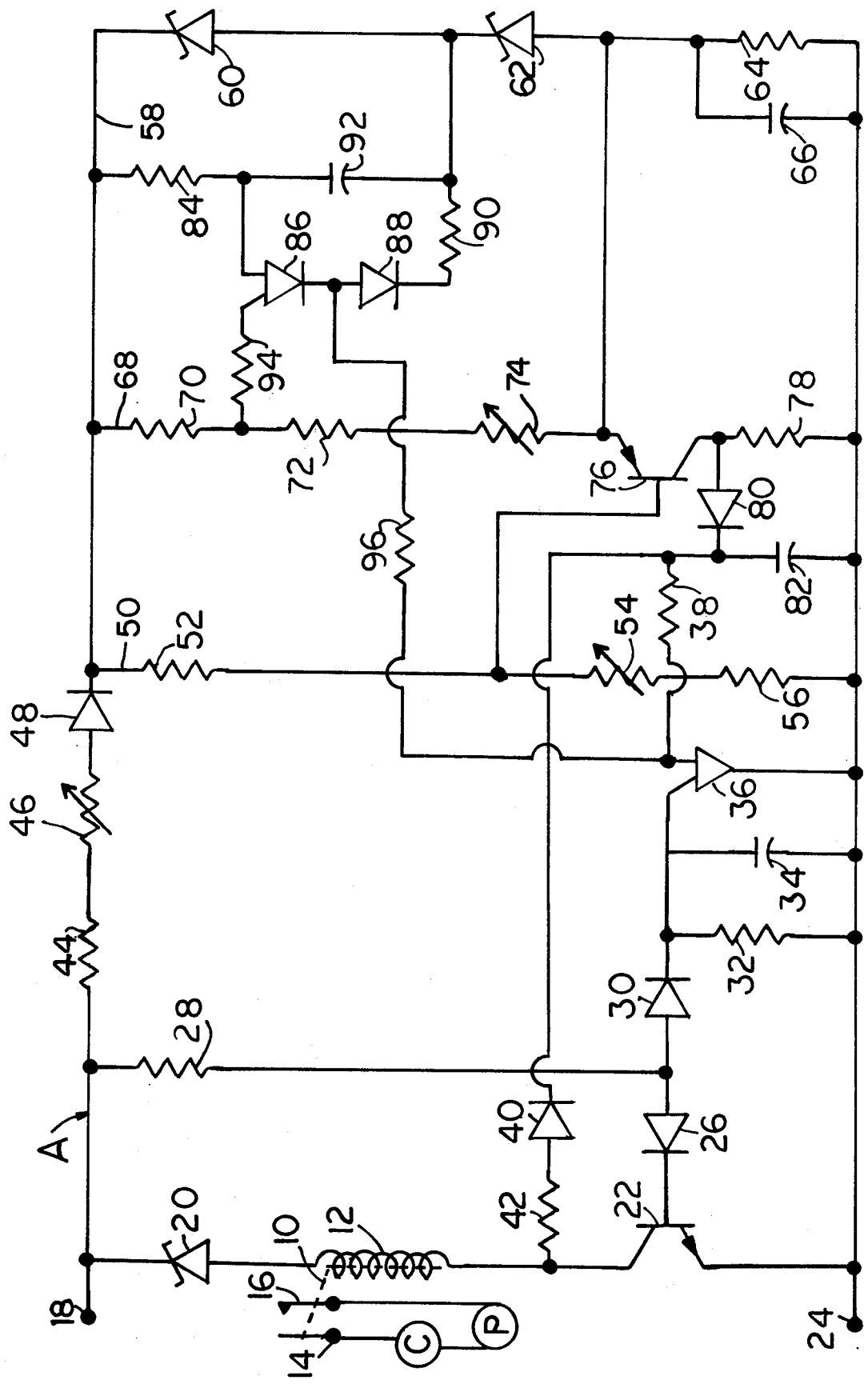

BATTERY CHARGER CONTROL DEVICE

It is the object of this invention to provide a control for monitoring the terminal voltage of a battery being charged and to provide a means for turning off the charger after the lapse of a predetermined period of time or when the battery becomes fully charged, whichever occurs first.

With the above and other objects in view which will become immediately apparent upon reading this specification, my invention resides in the unique and novel form, arrangement, construction and combination of the various parts hereinafter shown, described and claimed.

IN THE DRAWINGS

The FIGURE represents an electrical schematic diagram of a battery charger control device constructed in accordance with the present invention.

Referring now in more detail and by reference character to the drawings which illustrate a preferred embodiment of my invention, A designates a Battery Charging Control Device for controlling the supply of charging power to a battery (not shown) from a charger C connected to a source of electrical power P through a relay 10 having a core 12 and a pair of contacts 14, 16, which are normally open and which are connected in series to the line supplying power to the battery charger in the conventional manner. The core 12 is connected to a positive terminal 18 through a Zener diode 20 and to the collector of a transistor 22, the emitter of which is connected to a negative terminal 24. Also connected between the positive terminal 18 and the base of the transistor 22 through a blocking diode 26 is a resistor 28. Connected to the anode of the diode 26 is a second blocking diode 30, the cathode of which is connected to the negative terminal 24 through a resistor 32 in parallel with a capacitor 34. Also connected to the cathode of the blocking diode 30 the gate lead of a programmable unijunction transistor 36, the cathode of which is connected to the negative terminal 24, and the anode of which is connected to the collector of the transistor 22 through a resistor 38, a blocking diode 40 and a second resistor 42.

Connected in series across the terminals 18, 24, is a resistor 44, a variable resistor 46 of substantially smaller magnitude, a blocking diode 48 and a voltage dividing circuit 50 comprising a resistor 52, a variable resistor 54 and a resistor 56, the variable resistor 54 being of substantially smaller magnitude than the resistors 52 and 56.

Connected in parallel with the voltage divider circuit 50 is a following circuit 58 comprising a Zener 60, a second Zener 62 and a resistor 64 across which is connected a capacitor 66. Also connected in parallel with the voltage divider circuit 50 is a switching circuit 68 comprising a first resistor 70, a second resistor 72, a variable resistor 74, the collector of a transistor 76, the emitter of the transistor 76, and a third resistor 78. The collector of the transistor 76 is connected to the cathode of the Zener 62. The base of the transistor 76 is directly connected to the voltage divider circuit 50 between resistors 52 and 54. The emitter of the transistor 76 is also connected to the anode of the unijunction transistor 36 through a blocking diode 80 and the resistor 38. A capacitor 82 connects the cathode of the diode 80 to the negative terminal 24.

Connected in parallel with the Zener 60 is a resistor 84, a programmable unijunction transistor 86, a blocking diode 88 and a resistor 90. A capacitor 92 is connected between the anode of the SCR 86 and the anode of the Zener 60. The gate of the PUT 86 is connected to the common connection of the resistors 70, 72 through a resistor 94. The cathode of the PUT 86 is connected to the anode of PUT 36 through a resistor 96.

OPERATION

The relay contacts 14, 16, being normally open, control the supply of power to the battery charger when transistor 22 is in conduction causing current to flow through the coil 12 energizing the relay 10. When a battery is placed across terminals 18 and 24, transistor 22 normally starts conducting and remains in conduction until such time as the battery becomes charged to a predetermined voltage or until a preselected period of time has elapsed.

The means used to determine whether the battery has become charged or the prescribed period of time has elapsed is the capacitor 82, across which is developed a charge while transistor 22 is in conduction. The charge developed across capacitor 82 is applied to the anode of unijunction transistor 36 and when the charge is sufficient to place unijunction transistor 36 into conduction, such conduction removes the operating bias from the base of the transistor 22, causing transistor 22 to go out of conduction, stopping the flow of holding current through relay coil 12, thereby breaking the supply of power from the source P to the charger C. Once unijunction transistor 36 goes into conduction, it is held in conduction by the voltage applied through the coil 12, resistor 42 and resistor 38, thus keeping transistor 22 out of conduction until the battery is removed from the terminals 18, 24.

While transistor 22 is in conduction, the charge across capacitor 82 is developed by two separate methods within the system. The first method utilizes resistor 84 and capacitor 92 in combination with unijunction transistor 86. This combination functions as a pulse generator in which a pulse is developed when unijunction transistor 86 is caused to fire by the charge developed across capacitor 92. Such firing immediately discharges capacitor 92 and turns off unijunction transistor 86. The pulse being instantaneous is not sufficient to turn on unijunction transistor 36 (until such time as capacitor 82 develops a substantial charge) but is sufficient to gradually increase the charge of capacitor 82 through the resistor 38. It has been found that, if the magnitudes of the resistor 84 and capacitor 92 are selected to generate a pulse approximately every fifteen seconds, a sufficient charge can be developed across capacitor 82 in approximately twelve hours independently of the charge condition of the battery to place unijunction transistor 36 into conduction at that time.

Transistor 76 is utilized to shorten the charging time when the battery develops a terminal voltage sufficient to show it has been fully charged. A voltage representative of the terminal voltage of the battery is applied to the collector of the transistor 76 from the cathode of the Zener 62. The variable resistors 74 and 54 are preset to cause transistor 76 to go into conduction after the voltage applied across the terminals 18, 24, indicates the battery has begun accepting a substantial charge. Conduction of the transistor 76 immediately causes the voltage existing at the cathode of the Zener 62 to be developed across capacitor 82 through the blocking diode 80.

Transistor 76 stays in conduction until the applied voltage is removed from terminals 18, 24, and as that voltage is increased by the battery's developing a greater charge, the increase in voltage is simultaneously applied to capacitor 82 through transistor 76.

Similarly, when the voltage across capacitor 82 indicates the battery has been fully charged, the next pulse generated by unijunction transistor 86 turns on unijunction transistor 36. Depending upon the rate at which the battery develops a charge, transistor 76 can appreciably shorten the time the control device permits the charger C to stay in operation.

The following table shows the magnitudes and the components selected to create a suitable control devise for use with a volt battery.

| Resistors (ohms) | | | |
| --- | --- | --- | --- |
| 32 | 1 Meg. | .38 | 6.8K |
| 42 | 100K | | |
| 44 | 4.7K | | |
| 52 | 150K | | |
| 56 | 47K | | |
| 64 | 3.3K | | |
| 70 | 4.7K | | |
| 72 | 15 K | | |
| 78 | 100K | | |
| 84 | 1.2Meg. | | |
| 90 | 270 | | |
| 94 | 47K | | |
| 96 | 270K | | |
| Variable Resistors | | | |
| 46 | 0-270 | | |
| 54 | 0-4.7K | | |
| 74 | 0-2.2K | | |
| Capacitors | | | |
| 34 | 1 mfd. | | |
| 66 | 10 mfd. | | |
| 82 | 500 mfd. | | |
| 92 | 10 mfd. | | |
| Transistors | | | |
| 22 | MPS A20 | | |
| 76 | 404A | | |
| Unijunction Transistors | | | |
| 36 | 2N6027 | | |
| 86 | 2N6027 | | |
| Zeners | | | |
| 20 | 1N4742 | | |
| 60 | 1N4738 | | |
| 62 | 1N4738 | | |
| Blocking Diodes | | | |
| 26 | 1N2069 | | |
| 30 | 1N4154 | | |
| 40 | 1N4154 | | |
| 48 | 1N2069 | | |
| 80 | 1N4154 | | |
| 88 | 1N4154 | | |

This charger control is unique in that by the circuitry which has been invented, a minimum battery voltage across the terminals 18, 24, is not required for the control device to be operative, whereas most battery charge controls in existence require batterys to present at least a predetermined terminal voltage before the control device will become operative.

It should be understood that changes and modifications in the form, construction, arrangement and combination of various parts and elements shown herein may be made without departing from the nature and principle of my invention.

Having thus described my invention, what I claim and desire to secure by Letters Patent is recited in the following claims:

1. A battery charge control device for use with a battery charger operatively connected to a source of alternating power, said device comprising a pair of terminals;

a relay having a coil and a pair of normally open relay contacts, said contacts being interposed between the battery charger and the source of power in such manner that power will flow from the source to the charger when the coil is energized;

transistor switching means operatively connected to the terminals and to the coil and adapted for going into conduction and permitting energizing current to flow through the coil when a voltage is applied across the terminals;

a capacitor;

pulse generating means operatively connected to the capacitor for developing a charge in the capacitor when a voltage is applied across the terminals, said pulse generating means integrally including timing means for regulating the period of time required to bring the capacitor to a charged condition;

cutoff means for turning off the transistor switching means and stopping the flow of current through the coil when the capacitor has developed a predetermined charge;

and sensing means for monitoring the voltage across the terminals and for applying a charge to the capacitor independently of the pulse generating means when the voltage presented to the terminals exceeds a predetermined value.

2. The device of claim 1 which also includes adjustable means for selectively varying the terminal voltage required for the voltage sensing means to become operative.

3. A battery charger control device for use with a battery charger operatively converted to a source of alternating current power, said device comprising a pair of terminals, a relay having a coil and a pair of normally open relay contacts, said contacts being interposed between the battery charger and the source of power in such manner that power will flow from the source to the charger when the coil is energized, transistor switching means operatively connected to the terminals and to the coil and permitting energizing current to flow through the coil when a voltage is applied across the terminals, a capacitor, first PUT means operatively connected to the transistor switching means and to the capacitor in such manner that the PUT means goes into conduction when the capacitor develops a predetermined charge, in such manner that the transistor switching means goes out of conduction when the PUT means goes into conduction, voltage sensing means for placing the predetermined charge on the capacitor when the terminal voltage of the battery attains full charge voltage, and pulse generating means operatively connected to the battery terminals for generating pulses at intervals while a battery is connected to the terminals and for transmitting the pulses to the capacitor whereby to develop a charge gradually across the capacitor which is independent of the terminal voltage but which after a predetermined period of time be of sufficient magnitude to place the first PUT means into conduction.

* * * * *